US007562143B2

(12) United States Patent
Fellenstein et al.

(10) Patent No.: US 7,562,143 B2
(45) Date of Patent: Jul. 14, 2009

(54) MANAGING ESCALATING RESOURCE NEEDS WITHIN A GRID ENVIRONMENT

(75) Inventors: Craig Fellenstein, Brookfield, CT (US); Rick Allen Hamilton, II, Charlottesville, VA (US); Joshy Joseph, Poughkeepsie, NY (US); James Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 10/756,138

(22) Filed: Jan. 13, 2004

(65) Prior Publication Data

US 2005/0188088 A1     Aug. 25, 2005

(51) Int. Cl.
| | |
|---|---|
| G06F 15/173 | (2006.01) |
| G06F 13/42 | (2006.01) |
| G06F 3/00 | (2006.01) |
| G06F 12/00 | (2006.01) |
| G06F 12/14 | (2006.01) |
| G06F 13/14 | (2006.01) |
| G06F 13/00 | (2006.01) |
| G06F 13/28 | (2006.01) |
| H04L 12/28 | (2006.01) |

(52) U.S. Cl. ............... 709/226; 709/223; 370/254; 370/255; 370/256; 370/257; 370/258; 340/825; 710/36; 710/107; 710/200; 710/240; 711/150

(58) Field of Classification Search .............. None
See application file for complete search history.

(56) References Cited

U.S. PATENT DOCUMENTS 4,096,561 A    6/1978 Trincheri 5,729,472 A    3/1998 Seiffert et al.

(Continued)

FOREIGN PATENT DOCUMENTS

EP    0790559 A    8/1997

(Continued)

OTHER PUBLICATIONS

Rolia, Jerry et al., Service Centric Computing—Next Generation Interet Computing, 2002, Springer-Verlag Berlin Heidelberg.*

(Continued)

*Primary Examiner*—Kenny S Lin
*Assistant Examiner*—Tariq S Najee-Ullah
(74) *Attorney, Agent, or Firm*—David A. Mims, Jr.; Amy J. Pattillo

(57) ABSTRACT

A job is submitted into a first selection of resources in a grid environment from among a hierarchy of discrete sets of resources accessible in the grid environment. Discrete sets of resources may include locally accessible resources, enterprise accessible resources, capacity on demand resources, and grid resources. The performance of the first selection of resources is monitored and compared with a required performance level for the job. If the required performance level is not met, then the discrete sets of resources are queried for available resources to meet the required performance level in an order designated by said hierarchy. Available resources in a next discrete set of resource from the hierarchy of discrete sets of resources are added to a virtual organization of resources handling the job within the grid environment.

6 Claims, 6 Drawing Sheets

U.S. PATENT DOCUMENTS

| | | | |
|---|---|---|---|
| 5,881,238 A | 3/1999 | Aman et al. ............ 395/200.56 |
| 5,996,013 A | 11/1999 | Delp et al. |
| 6,463,457 B1* | 10/2002 | Armentrout et al. ......... 709/201 |
| 6,466,947 B2 | 10/2002 | Arnold et al. ............... 707/104 |
| 6,594,684 B1 | 7/2003 | Hodjat et al. |
| 6,615,373 B2 | 9/2003 | Elko et al. .................... 714/47 |
| 6,701,342 B1 | 3/2004 | Bartz et al. |
| 6,552,813 B2 | 4/2004 | Yacoub |
| 6,717,694 B1 | 4/2004 | Fukunaga et al. |
| 6,799,208 B1 | 9/2004 | Sankaranarayan et al. |
| 6,816,907 B1 | 11/2004 | Mei et al. |
| 6,954,739 B1 | 10/2005 | Boillet et al. |
| 7,050,184 B1 | 5/2006 | Miyamoto |
| 7,086,086 B2 | 8/2006 | Ellis |
| 7,181,302 B2 | 2/2007 | Bayne et al. |
| 7,234,032 B2* | 6/2007 | Durham et al. ............. 711/161 |
| 7,238,935 B2 | 7/2007 | Pritchard et al. |
| 7,245,584 B2 | 7/2007 | Goringe et al. |
| 7,269,757 B2 | 9/2007 | Lieblich et al. |
| 7,340,654 B2 | 3/2008 | Bigagli et al. |
| 7,426,267 B1 | 9/2008 | Caseau |
| 7,437,675 B2 | 10/2008 | Casati et al. |
| 2002/0023168 A1 | 2/2002 | Bass et al. |
| 2002/0072974 A1 | 6/2002 | Pugliese et al. |
| 2002/0152305 A1 | 10/2002 | Jackson et al. |
| 2002/0188486 A1 | 12/2002 | Gil et al. |
| 2003/0036886 A1 | 2/2003 | Stone |
| 2003/0058797 A1 | 3/2003 | Izmailov et al. |
| 2003/0101263 A1 | 5/2003 | Bouillet et al. |
| 2003/0108018 A1 | 6/2003 | Dujardin et al. |
| 2003/0126240 A1 | 7/2003 | Vosseler |
| 2003/0161309 A1 | 8/2003 | Karuppiah |
| 2003/0204758 A1 | 10/2003 | Singh |
| 2003/0212782 A1 | 11/2003 | Canali et al. |
| 2004/0064548 A1 | 4/2004 | Adams et al. |
| 2004/0103339 A1 | 5/2004 | Chalasani et al. |
| 2004/0145775 A1 | 7/2004 | Kubler et al. |
| 2004/0215590 A1* | 10/2004 | Kroening ........................ 707/1 |
| 2004/0215973 A1* | 10/2004 | Kroening .................... 713/201 |
| 2004/0225711 A1* | 11/2004 | Burnett et al. .............. 709/201 |
| 2005/0027785 A1* | 2/2005 | Bozak et al. ................ 709/200 |
| 2005/0071843 A1 | 3/2005 | Guo et al. |
| 2005/0154789 A1 | 7/2005 | Fellenstein et al. |
| 2005/0160423 A1* | 7/2005 | Bantz et al. ..................... 718/1 |
| 2006/0075042 A1 | 4/2006 | Wang et al. |
| 2006/0294238 A1* | 12/2006 | Naik et al. .................. 709/226 |

FOREIGN PATENT DOCUMENTS

EP        1267552 A     12/2002

OTHER PUBLICATIONS

Belloum, Adam et al., VLAM-G: a grid-based virtual laboratory, 2002, Future Generation Computer Systems 19, Elsevier Science B.V.*

Min, D. and Mutka, M., Efficient Job Scheduling in a Mesh Multicomputer Without Discrimination Against Large Jobs, 1995, IEEE.*

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian XU et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS In Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Hollingsworth, Jeffrey and Tierney, Brian, "Grid2—Blueprint for a New Computing Infrastructure" 2004, Elsevier, San Francisco, CA, chapter 20, Instrumentation and Monitoring, pp. 319-343.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

Al-Theneyan, Ahmed Hamdan, "A Policy-Based Resource Brokering Environment for Computational Grids" (2002) PHD Dissertation, Old Dominion University, United States—Virginia.

Leff, Avraham, "Service Level Agreements and Commercial Grids", IEEE Internet Computing (Jul.-Aug. 2003): pp. 44-50.

Hill, J.R. "A Management Platform for Commercial Web Services." BT Technology Journal (Jan. 2004): vol. 22, No. 1, pp. 52-62).

Alexander Keller and Heiko Ludwig, "The WSLA Framework: Specifying and Monitoring Service Level Agreements for Web Services." Journal of Network and Systems Management, vol. 11, No. 1, Mar. 2003, pp. 57-81.

Menasce, Daniel A, "QOS in Grid Computing", IEEE Internet Computing (Jul.-Aug. 2004), pp. 85-87.

T Boden, "The Grid Enterprise—Structuring the Agile Business of the Future." BT Technology Journal, vol. 22, No. 1, Jan. 2004, pp. 107-117.

USPTO Office Action, U.S. Appl. No. 11/031,403, Mailing Date Oct. 24, 2008, 19 Pages.

* cited by examiner

MANAGING ESCALATING RESOURCE NEEDS WITHIN A GRID ENVIRONMENT

CROSS-REFERENCE TO RELATED APPLICATIONS

The present application is related to the following co-pending applications:

(1) U.S. patent application Ser. No. 10/756,134.

BACKGROUND OF THE INVENTION

1. Technical Field

The present invention relates in general to improved performance of jobs within a grid environment and in particular to a method for managing escalating resource needs within a grid environment to meet quality of service requirements. Still more particularly, the present invention relates to managing access by a client system to a hierarchy of resources within a grid environment as need for additional resources escalate to handle a job according to performance requirements for the job.

2. Description of the Related Art

Ever since the first connection was made between two computer systems, new ways of transferring data, resources, and other information between two computer systems via a connection continue to develop. In a typical network architecture, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within company networks and beyond, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources from geographically distributed systems operated by different organizations with differing policies and management systems are organized to handle a job request.

In addition to decentralizing resources available in a grid environment to improve efficiency of network transactions, capacity on demand resources are gaining more presence. An on demand resource is one that is accessible to a system, but is operational only when a fee is paid or an electronic key to open the resource is provided.

An important attribute of a grid environment that distinguishes a grid environment from merely that of another network management system is quality of service maintained across multiple diverse sets of resources. A grid environment does more than just provide resources; a grid environment provides resources with a particular level of service including response time, throughput, availability, security, and the co-allocation of multiple resource types to meet complex user demands. A limitation of current grid technology, however, is that maintenance of agreed to quality of service from grid resources requires human intervention. For example, human intervention is relied on in a grid environment to decide when to allocate and deallocate resources to reach specified performance levels. Further, manual intervention is relied on in a grid environment to suspend low priority jobs or move jobs to other selections of resources within the grid environment. Manual intervention is limiting on the efficiency and expansion of grid environments because it is by nature inefficient and prone to error.

As a result of developing grid environments and on demand resources, a single system may have access to multiple discrete sets of resources. For example, first, a system typically accesses those components within the system that provide a primary set of local resources. Next, a system may access resources from other systems within a local or enterprise network. Further, a system may access and activate capacity on demand resources either from within the system or from a system accessible via a network. Finally, a system may access grid resources accessible through participation in a grid environment.

With the availability of multiple sets of discrete resources, an additional limitation of current grid technology is that human intervention is required to manage the flow between each of these discrete sets of resources to determine whether use of grid resources is required. Further, human intervention is required to determine whether to activate capacity on demand resources first or go directly to grid resources. Thus, a disadvantage of current grid technology is that when a job request is executing within a set of resources that become unable to handle performance requirements for the job, human intervention is required to decide whether to schedule the job into a grid environment or other set of resources.

Therefore, in view of the foregoing, it would be advantageous to provide a method, system, and program for automated allocation of additional resources from a hierarchy of sets of resources and manage the flow of a job through the hierarchy of sets of resources, including grid resources. In particular, it would be advantageous to provide a method, system, and program for determining when it is necessary to schedule a job for use of additional levels of resources, including grid resources, based on the performance characteristics of each level of resources and the eligibility of the job for additional resources. Further, in particular, it would be advantageous to provide a method, system, and program for automated activation and deactivation of capacity of demand resources included in the hierarchy of resources within a grid environment available for allocation.

SUMMARY OF THE INVENTION

In view of the foregoing, the present invention provides improved performance of jobs within a grid environment and in particular provides a method, system, and program for managing escalating resource needs within a grid environment to meet quality of service requirements. Still more particularly, the present invention relates to managing access by a client system to a hierarchy of resources within a grid environment as needs for additional resources escalate to handle a job according to performance requirements for the job.

According to one embodiment of the present invention, a job is submitted into a first selection of resources in a grid environment from among a hierarchy of discrete sets of resources accessible in the grid environment. The performance of the first selection of resources is monitored and compared with a required performance level for the job. The required performance level for a job may include quality of service requirements based on service level agreements and objectives. If the required performance level is not met, then the discrete sets of resources are queried for available resources to meet the required performance level in an order designated by said hierarchy. Available resources in a next discrete set of resource from the hierarchy of discrete sets of resources are added to a virtual organization of resources handling the job within the grid environment. In particular, the virtual organization of resources may include the first selection of resources and the added resources which are distributed across heterogeneous systems.

Hierarchical orders of discrete sets of resources are specified for particular jobs. The discrete sets of resources include, but are not limited to, locally accessible resources, enterprise accessible resources, capacity on demand resources, and grid resources.

According to another aspect of the present invention, not all jobs may qualify for additional resources. Therefore, before additional resources are queried, a determination is first made whether the job qualifies for the additional resources based on job priority or other qualification.

According to yet another aspect of the present invention, when a capacity on demand resource is added to the virtual organization of resources handling the job, the capacity of demand resource is first allocated. When the capacity on demand resource is no longer needed, however, the capacity on demand resource is deallocated. The capacity on demand resource may be no longer needed at the completion of the job or when other resources are sufficient for handling the job.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
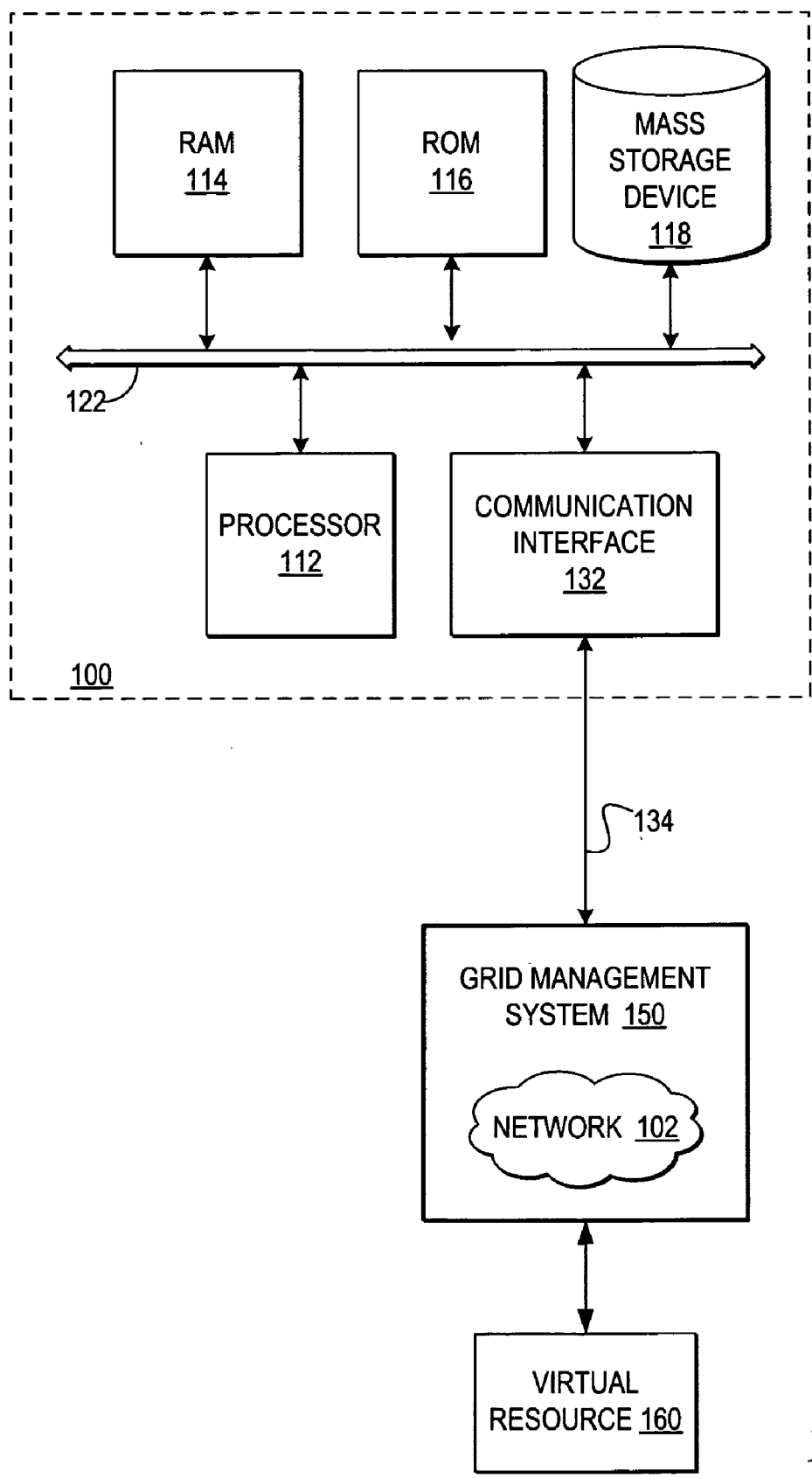
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 8, 9, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100. Further, grid management system 150 may organize a grid environment which includes the systems included in virtual resource 160.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
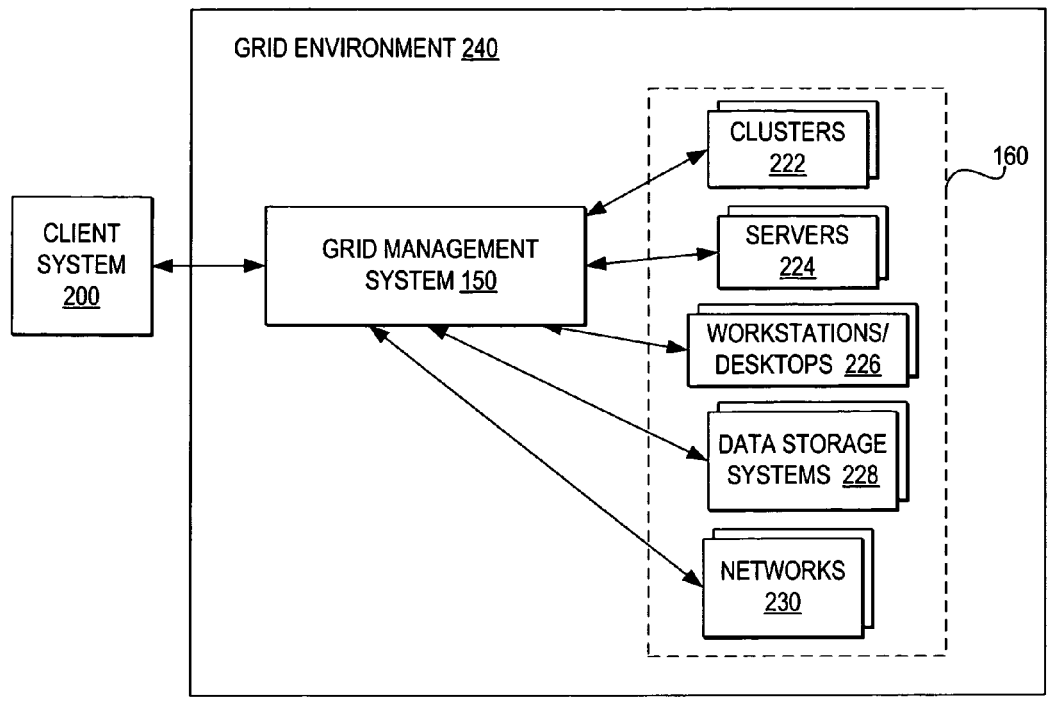
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be locally accessible to client system 200, some systems may be accessible within an enterprise in which client system 200 operates, and still other systems may require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

Grid environment 240, as managed by grid management system 150, may provide a single type of service or multiple types of services. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

Figure 3:
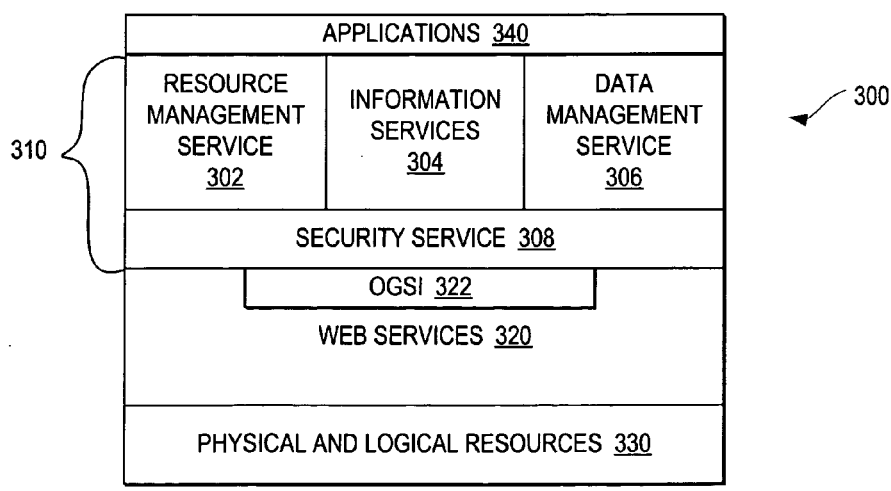
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
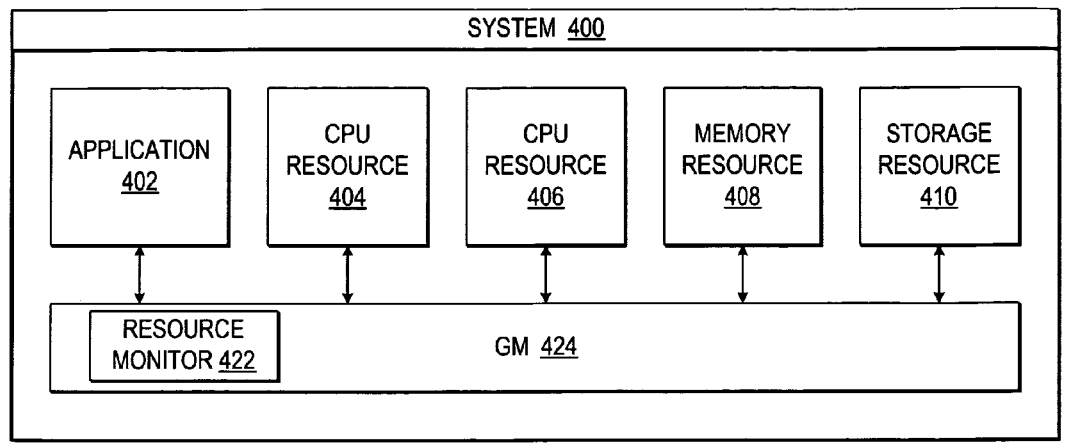
FIG. 4 is a block diagram depicting a system operating within the grid environment from the perspective of the grid management system in accordance with the method, system, and program of the present invention.

With reference now to FIG. 4, a block diagram of a system operating within the grid environment from the perspective of the grid management system is depicted in accordance with the method, system, and program of the present invention. As illustrated in FIG. 1, a computer system includes many hardware components. As part of a grid environment, however, these hardware components are viewed as resources. For example, a system 400 includes an application resource 402, two CPU resources 404 and 406, a memory resource 408, and a storage resource 410. The resources in system 400 are typical of the types of resources when viewed within the grid environment, however, in an alternate embodiment, other types of resources may be provided. Further, the resources in system 400 may be physically located within a single computer system or distributed across multiple computer systems connected by a network, for example.

As part of the grid management system described in FIG. 2, a grid manager and router (GM) 424 provides the interface between the resources of system 400 and client systems sending requests.

In particular, a resource monitor 422 within GM 424 monitors the working status of each of the resources available in system 400. GM 424 preferably sends status reports to other grid managers and routers within the grid environment to indicate the availability of the resources in system 400. Additionally, status reports may describe the computer hardware, operating system, and resources of system 400. Status reports may be generated, for example, when system 400 joins or leaves the grid environment, when a threshold is detected, at predetermined time intervals, and on specific predetermined events, including, but not limited to a hardware fault or a portion of a service failing.

Figure 5:
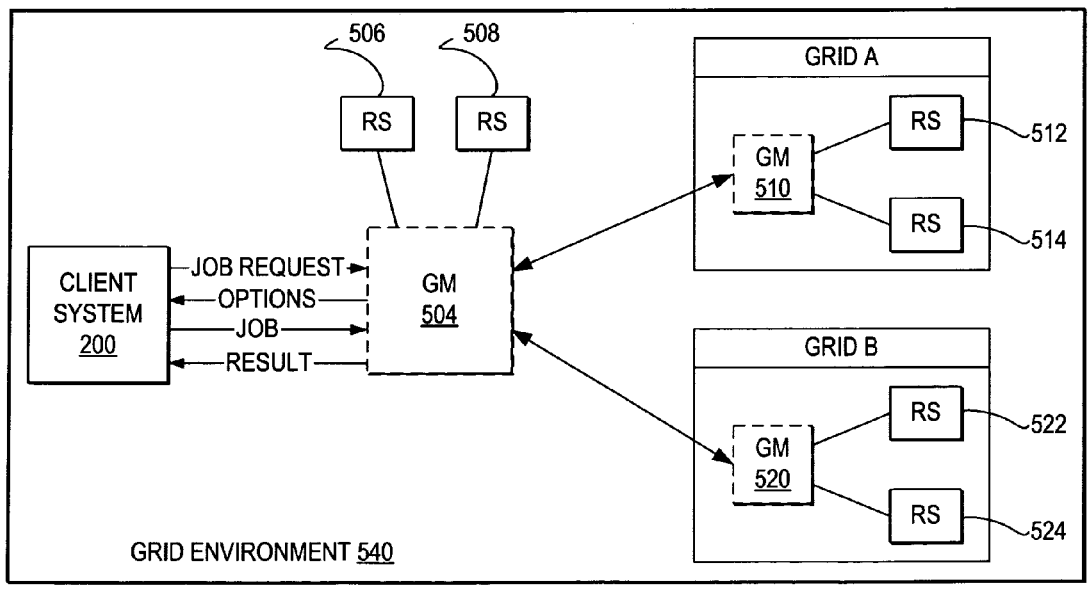
FIG. 5 is an illustrative representation depicting one embodiment of the logical infrastructure of a grid environment in which the present invention may be implemented.

Referring now to FIG. 5, an illustrative representation depicts one embodiment of the logical infrastructure of a grid environment in which the present invention may be implemented. While FIG. 2 depicts an example of general components of a grid environment, in the present figure, an example of how the general components are viewed logically within a grid environment is illustrated in a grid environment 540. In particular, the grid management system functions are logically dispersed into multiple GMs, such as GM 504, GM 510, and GM 520. Further, the virtual resource is logically dispersed into multiple resources (RSs), such as RS 506, RS 508, RS 512, RS 514, RS 522, and RS 524. It is important to note that a resource may not be a direct representation of a physical resource, but rather a logical representation of one or more physical resources and or groups of physical resources.

In the example, client system 200 sends a job request to GM 504. GM 504 searches for resources available to handle the job specified in the job request. In particular, GM 504 checks whether RS 506 and RS 508 can handle the job specified in the job request and may send queries to other GMs, such as GM 510 or GM 520. GMs 510 and 520 return reports on the availability of resources to handle the job request.

For purposes of illustrations, RS 506 and RS 508 are considered local resources or resources within the same discrete set of resources to which jobs from client system 200 are submitted. In the examples following, when RS 506 and 508 are not meeting performance requirements for a job from client system 200, then additional resources may be allocated including other resources within the same discrete set of resources, capacity on demand resources, resources from internal grids and finally resources from external grids.

More specifically, in the example, GM 510, RS 512, and RS 514 are part of one grid infrastructure "grid A" operated by a first business that provides a first specified number of grid services for a first specified price. Then, GM 520, RS 522, and RS 524 are part of another grid infrastructure "grid B" operated by a second business that provides a second specified number of grid services for a second specified price. When GM 504 sends the job request to GM 510 and GM 520, the each GM preferably reports whether the job request can be handled and a price for handling the request. In relation to client system 200, grids A and B may be internal grids operating within the same enterprise system as client system 200 or external grids.

After receiving reports on the availability of resources, GM 504 collects the options for handling the job and returns the options to client system 200. Client system 200 may then decide to select a preferred option and send the job to have handled according to the selected option. GM 504 manages the return of the results of the job to client system 200.

The resources utilized in the option selected by client system 200 form a virtual organization for handling the job. For example, if client system 200 selects an option to handle the job based on the option returned from GM 510, then a virtual organization may be formed to process the job which would include GM 504, GM 510, RS 512, and RS 514. According to an advantage of the present invention, any of the GMs may also automatically allocate additional resources to a job after it is submitted to a first selection of resources. In particular, if the resources handling a job do not meet performance specifications, then additional resources may be allocated to the virtual organization of resources formed to process the job. These performance specifications may include quality of service specifications compiled from service level objects and agreements.

Figure 6:
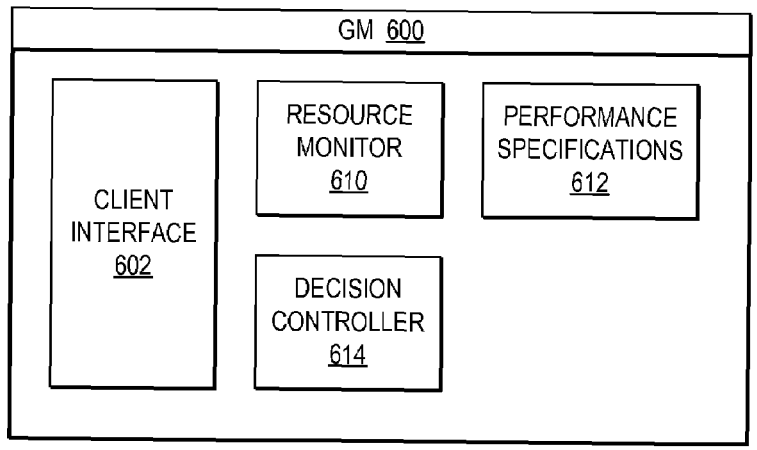
FIG. 6 is a block diagram depicting a grid manager or router (GM) that may implement the present invention.

With reference now to FIG. 6, there is depicted a block diagram of a grid manager or router (GM) that may implement the present invention. As depicted, a GM 600 includes a client interface 602 for receiving jobs. Client interface 602 assigns a unique identifier to each job for distribution by GM 600. In particular, client interface 602 may require authentication of the client sending the job request before the job is assigned a job identifier and transferred to decision controller 614.

Once a job request is received at GM 600, GM 600 preferably determines which resources are available for the job, submits the job to a first selection of resources, and monitors the resources handling the job. In particular, to perform these functions, a resource monitor 610 within GM 600 preferably monitors the availability of multiple levels of resources accessible to GM 600 to determine current usage levels. Then, a decision controller 614 within GM 600 preferably determines resource options to meet performance specification 612 designated for the job request or for the requesting client. Once decision controller 614 schedules and submits a job to a virtual organization of resources, initially including the first selection of resources, then decision controller 614 checks the performance of the virtual organization of resources to determine if additional resources need to be allocated. In particular, decision controller 614 may be required to make complex decisions with respect to allocating additional resources for a particular job to maintain performance service level agreements with the client sending the job request. For example, decision controller 614 may decide when to allocate additional resources to a virtual organization of resources handling the job to maintain performance service level agreements specified in performance specification 612 for the job request.

According to one advantage of the present invention, performance specifications 612 may specify a resource hierarchy which designates the order in which additional resources are queried for availability to handle all or a portion of a job. As will be further described, for purposes of example, a resource hierarchy may specify an order starting with resources in a primary environment, then capacity on demand resources within a client enterprise, then additional resources within the client enterprise, grid resources within a client enterprise, and finally grid resources outside a client enterprise. It will be understood that other orders and types of resources hierarchies may be implemented.

Further, performance specifications 612 may include quality of service specifications. The quality of service specifications designate requirements for a particular job, client system, or other entity. The quality of service specifications may be based on service level agreements and objectives. It will be understood that other types of performance related specifications may be included in performance specifications 612.

Figure 7:
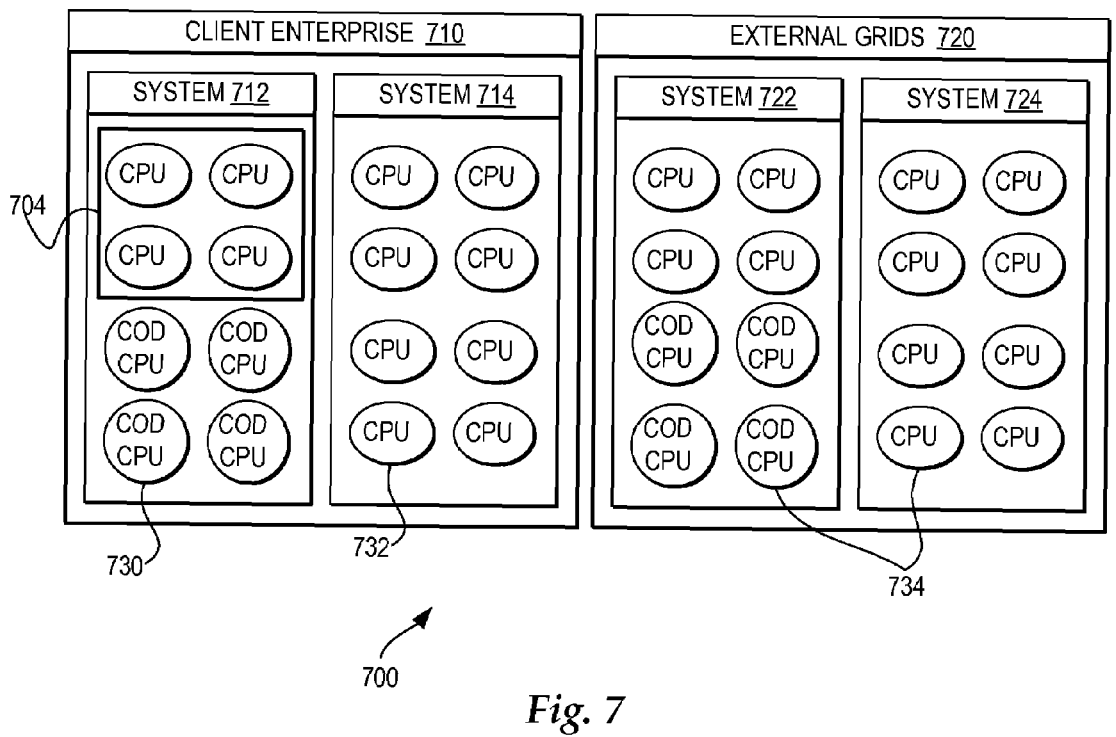
FIG. 7 is a block diagram depicting an example of a hierarchy of resources accessible to a grid manager or router for distribution of a job request.

Referring now to FIG. 7, there is depicted a block diagram of an example of a hierarchy of resources accessible to a grid manager or router for distribution of a job request. As depicted, a resource hierarchy 700 is accessible to a GM for handling a job request. According to an advantage of the present invention, job requests from a client system may be handled by resources within a primary or local environment. Next, job requests may be handled by additional resources accessible within the client enterprise or from external grids.

In the example, resource hierarchy 700 includes a client enterprise 710 and external grid resources 720. Client enterprise 710 may be a networked enterprise of computer systems accessible to a system located within client enterprise 710 or accessible to a system with rights to access client enterprise 710. The networked enterprise may include multiple types of systems of resource grouping from grids of server resources to networked desktop systems.

For purposes of illustration, a client system sends a job request to a GM with a primary environment of the resources indicated at reference numeral 704 within system 712. If threshold usage is reached for the four CPU resources indicated at reference numeral 704, then for a job qualifying for additional resources, the next level of resources within resource hierarchy 700 is preferably queried. In the example, the next level of resources includes capacity on demand (COD) CPUs, such as the COD CPU indicated at reference numeral 730. COD CPUs and other capacity on demand resources are preferably resources that are built into a system, but not accessed until demand exceeds the current capacity of the available resources. Use of COD resources may require payment of a fee in return for an electronic key which unlocks limited or unlimited use of the resource. According to one advantage of the invention, if a capacity on demand resource is allocated for a particular job, once the capacity on demand resource is no longer needed, it is preferably deallocated.

Next, if a COD CPU is not accessible or is not sufficient to meet the job execution requirements, the GM searches whether any resources are accessible from other systems within client enterprise 710. For example, a CPU indicated at reference numeral 732 may be accessible in system 714 within client enterprise 710. System 714 may include, for example, other server systems, other desktop systems, and other owned or leased grid systems.

Finally, the GM searches whether any resources are accessible from external grids, such as external grids 720. External grids 720 include multiple systems of resources, such as systems 722 and 724. Multiple resources may be accessed from multiple grid systems, as indicated at reference numeral 734. Further, systems within external grids 720 may include COD resources.

Although not depicted, the GM may disperse portions of a job request across multiple levels of resources included in a virtual organization. For example, a job initially executing in the CPU resources indicated at reference numeral 704. When the CPU resources reach threshold operating levels, a portion of the job may be dispersed to external grids 720, for example, to achieve the performance levels required for the job request.

Figure 8:
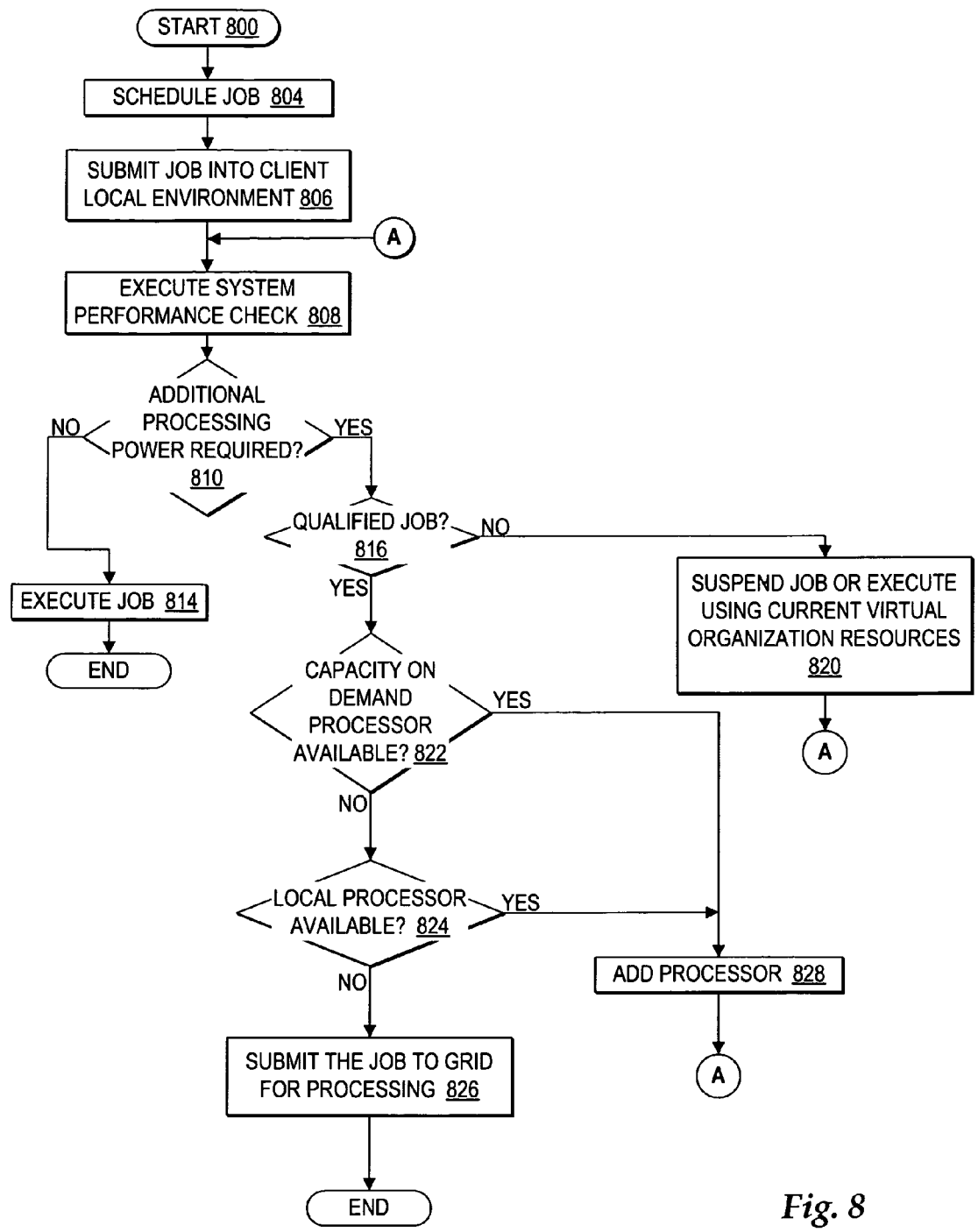
FIG. 8 is a high level logic flowchart depicting a process and program for managing job distribution to distributed resources.

Referring now to FIG. 8, there is illustrated a high level logic flowchart of a process and program for managing job distribution to distributed resources. As depicted, the process starts at block 800 and thereafter proceeds to block 804. Block 804 depicts scheduling a job. In particular, job characteristics and eligibility for additional resources are specified during job scheduling. In the example, the job is scheduled for use of processing resources and thus the steps of the process reflect those taken for determining whether additional processing resources are required and if so, acquiring the additional processing resources. It will be understood that in alternate embodiments, a job may be scheduled for use of other types of resources including, but not limited to, applications, memory, disk space, I/O subsystems, and networks.

Next, block 806 depicts submitting the job into a selection of resources in a local environment. The selection of resources in the local environment is the initial set of resources in a virtual organization for handling the job. In particular, considerations for job submission may include, but are not limited to, operating system type, kernel width, application threading, CPU requirements, memory requirements, application configurations, and other factors. In one example of submitting the job into the local client environment, a determination is made whether the job is single threaded or multi-threaded. If the job is single threaded, then the job is queued at one processor. If the job is multi-threaded, then the job is queued at multiple processors.

Thereafter, block 808 illustrates executing a system performance and availability check. The resource monitor, for example, may execute the system performance check that surveys the performance of the resources included in the virtual organization for handling the job. In particular, many factors or a combination of factors may be used to determine system performance including, but not limited to, the depth of the processor(s) run queue, the amount of memory available, the amount of disk space free, and the network bandwidth available. Multiple types of performance monitoring tools capable of providing performance related information may be implemented by the resource monitor including, but not limited to, International Business Machine Corporation (IBM) Performance Toolbox or invoking an operating system command, such as the "vmstat" command in the UNIX operating system.

Next, block 810 illustrates a determination whether additional processing power is required to process the current job. As previously described, this step requires a determination whether the current resource saturation of those resources monitored by the system performance check exceeds predefined thresholds for resource saturation for the job request or client system. In particular, in deciding whether additional resources are required, additional factors such as duration, type of resource saturated, and frequency of resource saturation may be taken into account. In the example, if system performance is acceptable, then no additional processing power is required and the process passes to block 814 where the job is executed in the resources included in the virtual organization in a normal manner. If additional processing power is required, then the process passes to block 816.

Block 816 depicts a determination whether the job is eligible for additional resources based on the priority of the job or other required qualification. In particular, the saturation levels of the resources within the virtual organization may reach levels that indicate additional processing power is required for processing the job. Not every job, however, will qualify for the addition of processing power. For example, jobs which are non-interactive and thus do not require specific performance may not be eligible for access to additional system resources. Further, if certain jobs begin to affect the performance of higher priority jobs, the job priority of a job may be reduced using tools such as a UNIX "nice" command. Moreover, if a job continues to operate in sub-optimal conditions even as more resources are added to the virtual organization, the job may stop qualifying for yet another level of resources. In comparison, some jobs may be designated as always valuable and granted broad access to additional resources. If the job is qualified, then the process passes to block 822, where a selection of additional resources will be accessed from a hierarchy of additional resources. If the job is not qualified, then the process passes to block 820. Block 820 illustrates suspending the job or only executing the job using the resources of the virtual organization, and the process returns to block 808.

Block 822 illustrates a determination whether capacity on demand processing is available. If capacity on demand processing is available, then the process passes to block 828. Block 828 depicts adding a processor for processing the job or portions of the job, and in particular a capacity on demand processor, and the process returns to block 808. Upon returning to block 808, if performance is stabilized with the addition of the resources, the job will continue executing. If however, upon returning to block 808, the performance remains degraded, based on job qualifications, additional resources may be added.

Alternatively, at block 822, if a capacity on demand processor is not available, then the process passes to block 824. Block 824 depicts a determination of whether a local processor is available. A local processor may be a processor available from within a client enterprise, for example. If a local processor is available, then the process passes to block 828, where the local processor is added for processing the job or portions of the job and the process returns to block 808. If a local processor is not available, then the process passes to block 826. Block 826 depicts submitting the job to the grid for processing, and the process ends. A job might first be submitted to an internal grid if available, and then to an external grid only if the internal grid was not available. In particular, the process starting with block 822 depicts one method of traversing hierarchical resources. In an alternate embodiment, the process may first determine if there are other local processors available and next determine whether there is capacity on demand processing available, for example.

Figure 9:
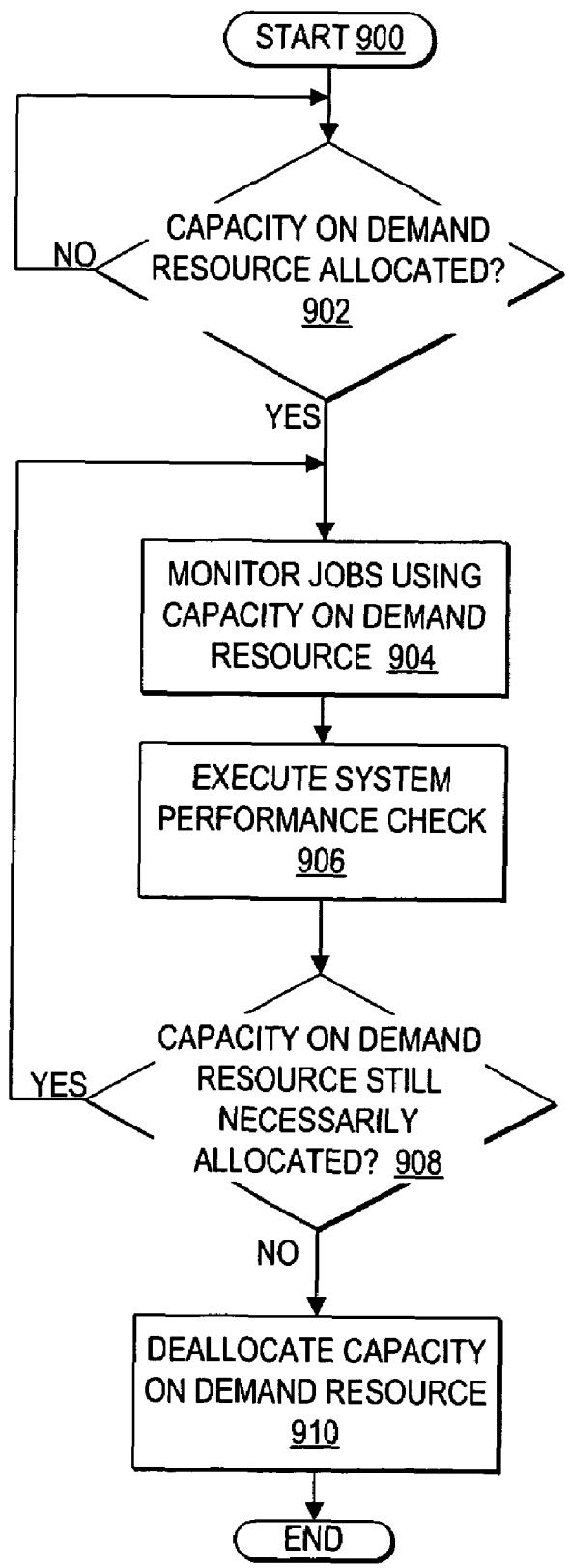
FIG. 9 is a high level logic flowchart depicting a process and program for monitoring capacity on demand resources.

With reference now to FIG. 9, there is illustrated a high level logic flowchart of a process and program for monitoring capacity on demand resources. As illustrated, the process starts at block 900 and thereafter proceeds to block 902. Block 902 depicts a determination whether a capacity on demand resource is allocated as an additional resource. If no capacity on demand resource is allocated as an additional resource, then the process iterates at block 902. If a capacity on demand resource is allocated as an additional resource, then the process passes to block 904. Block 904 illustrates monitoring jobs currently using the capacity on demand resource. Thereafter, block 906 depicts executing a system performance check. Alternatively, the results from the system performance check depicted in FIG. 8 may be implemented in the current process. Next, block 908 illustrates a determination whether the capacity on demand resource is still necessarily allocated. For example, a determination may be made whether resources are operating above thresholds and whether upcoming jobs qualify for additional capacity on demand resource. Further, a determination may be made whether the job is complete. If the capacity on demand resource is still necessarily allocated, then the process returns to block 904. If the capacity on demand resource is not still necessarily allocated, then the process passes to block 910. Block 910 depicts deallocating the capacity on demand resource, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for managing escalating resources needs of a job submitted in a grid environment, comprising:

enabling a grid environment comprising a plurality of computing systems each comprising at least one resource and communicatively connected over a network to share each said at least one resource through at least one grid service implemented within an open grid services architecture;

organizing, by a grid management system, said at least one resource into a hierarchy of discrete sets of resources comprising a plurality of local resources, a plurality of capacity on demand resources, and a plurality of external grid resources;

receiving a plurality of separate job requests from a plurality of client systems over said network at a grid management system;

submitting a particular job from among said plurality of jobs received at a said grid management system from a particular client system from among said plurality of client systems to a virtual organization comprising a first selection of said plurality of local resources from among said hierarchy of discrete sets of resources;

monitoring a performance level of said virtual organization handling said particular job;

comparing said performance level of said virtual organization with a performance requirement for said particular job;

responsive to a performance level of said virtual organization not meeting a required performance level for said particular job, querying said hierarchy of discrete sets of resources in an order designated by said hierarchy from among said second selection of capacity on demand resources and said third selection of external grid resources to meet said required performance level for said particular job; and responsive to identifying at least one available additional resource from said hierarchy of discrete sets of resources, adding said at least one available additional resource to said virtual organization of said resources handling said particular job within said grid environment, such that escalating resource needs of said particular job in said grid environment are managed by hierarchically adding resources from discrete sets of resources within said grid environment to said virtual organization of said resources already handling said particular job.

2. The method according to claim 1 for managing escalating resource needs of a job submitted in a grid environment wherein submitting a particular job from among said plurality of jobs received at a said grid management system from a particular client system from among said plurality of client systems to a virtual organization comprising a first selection of said plurality of local resources from among said hierarchy of discrete sets of resources further comprises:

submitting said particular job to said virtual organization comprising said first selection of resources comprising at least one from among resources locally accessible to said particular client system initiating said job and resources accessible within an enterprise within which said particular client system operates.

3. The method according to claim 1 for managing escalating resource needs of a job submitted in a grid environment, wherein said hierarchy of discrete sets of resources is particularly specified for said particular job.

4. The method according to claim 1 for managing escalating resource needs of a job submitted in a grid environment, further comprising:

responsive to said performance level of said virtual organization of said first selection of resources not meeting said required performance level for said particular job, determining whether said particular job qualifies for additional resources; and only querying said hierarchy of discrete sets of resources for available resources if said particular job qualifies for additional resources.

5. The method according to claim 1 for managing escalating resource needs of a job submitted in a grid environment, further comprising:

responsive to said performance level of said virtual organization of said first selection of resources not meeting said required performance level for said particular job, determining whether said particular job qualifies for at least one capacity on demand resource; and responsive to said capacity on demand resource being identified as said at least one available additional resource from said hierarchy of discrete sets of resources, activating said capacity on demand resource by paying a fee in return for an electronic key which unlocks use of said capacity on demand resource.

6. The method according to claim 5 for managing escalating resource needs of a job submitted in a grid environment, further comprising:

deallocating said capacity on demand resource when not needed for said particular job.

\* \* \* \* \*